US006775666B1

(12) United States Patent
Stumpf et al.

(10) Patent No.: US 6,775,666 B1
(45) Date of Patent: Aug. 10, 2004

(54) METHOD AND SYSTEM FOR SEARCHING INDEX DATABASES

(75) Inventors: Mark D. Stumpf, Auburn, WA (US); Harish Jayanti, Seattle, WA (US); Paul Konasewich, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 433 days.

(21) Appl. No.: 09/867,228

(22) Filed: May 29, 2001

(51) Int. Cl.[7] .............................................. G06F 17/30
(52) U.S. Cl. ............................................. 707/5; 707/4
(58) Field of Search ............................ 707/3, 5, 4, 10

(56) References Cited

U.S. PATENT DOCUMENTS

| | | | | | |
|---|---|---|---|---|---|
| 5,303,361 A | * | 4/1994 | Colwell et al. | ................. | 707/4 |
| 6,026,398 A | * | 2/2000 | Brown et al. | ................... | 707/5 |
| 6,081,774 A | * | 6/2000 | de Hita et al. | ................... | 704/9 |
| 6,317,741 B1 | * | 11/2001 | Burrows | ......................... | 707/5 |
| 6,338,056 B1 | * | 1/2002 | Dessloch et al. | .............. | 707/2 |
| 6,411,950 B1 | * | 6/2002 | Moricz et al. | .................. | 707/3 |
| 6,415,283 B1 | * | 7/2002 | Conklin | .......................... | 707/3 |
| 6,446,064 B1 | * | 9/2002 | Livowsky | ....................... | 707/5 |
| 6,453,339 B1 | * | 9/2002 | Schultz et al. | .............. | 709/206 |
| 6,556,986 B2 | * | 4/2003 | Hara et al. | ...................... | 707/2 |
| 6,594,657 B1 | * | 7/2003 | Livowsky | ....................... | 707/5 |
| 6,598,039 B1 | * | 7/2003 | Livowsky | ....................... | 707/3 |

OTHER PUBLICATIONS

Slonim, Noam and Naftali Tishby Document Clustering using Word Clusters via the Information Bottleneck Method *School of Computer Science and Engineering and The Interdisciplinary Center for Neural Computation, The Hebrew University, Jerusalem 91904, Israel* Jul. 2000 pp. 208–215.

Topalogulu, N. Yasemin et al. "Characterization of Centralized and Decentralized Text Information Retrieval Search Platforms Using OMT" *Advances in Computer and Information Sciences IOS Press* (1998) pp. 519–526.

Can, Fazli "On the Efficiency of Best–Match Cluster Searches" *Information Processing & Management* (1994); vol. 30, No. 3, pp. 343–361.

Rude, Gerda et al. "Natural Language Access to Free–Text Databases" *Proceedings of the Forty–Fourth FID Congress* Helsinki, Finland Aug. 28–Sep. 1,1988, pp. 153–162.

Vries, John K. et al. "An Automated Indexing System Utilizing Semantic Net Expansion" *Computers and Biomedical Research* (1992) vol. 25, pp. 153–167.

Samstag–Schnock, Uwe and Charles T. Meadow "PBS: An Economical Natural Query Interpreter" *Journal of the American Society for Information Science* (1993); 44(5):265–272.

\* cited by examiner

*Primary Examiner*—Greta Robinson
(74) *Attorney, Agent, or Firm*—Ronald M. Anderson

(57) ABSTRACT

A method and system for searching index databases allows a user to search for specific information using high-level key words, questions, or sentences. The system includes three main segments: a searchable content database, a run time search component, and a user interface. The searchable content database includes a full text index and a lookup table. The search component includes a results list database, an exact match search, a natural language processor (NLP), and a full text search. Indexes, prioritized search tokens, and word clusters are combined to create a better search experience. A user's query is processed into prioritized clustered tokens using the NLP, token priority rules, and word clusters.

23 Claims, 21 Drawing Sheets

305

405

NLP TRANSLATES THE QUERY TO GET THE LABELS FOR THE IMPORTANT WORDS.

410

PRIORITY RULES APPLIED TO LABELED TOKENS.

415

WORD CLUSTERS APPLIED TO PRIORITIZED TOKENS.

FIG. 5
363 
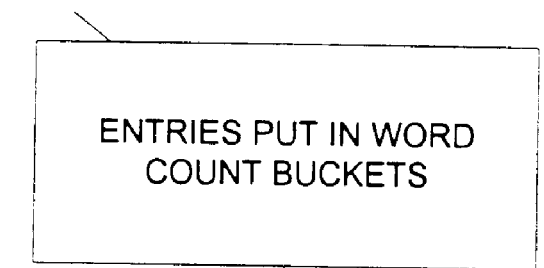
505 — ENTRIES PUT IN WORD COUNT BUCKETS
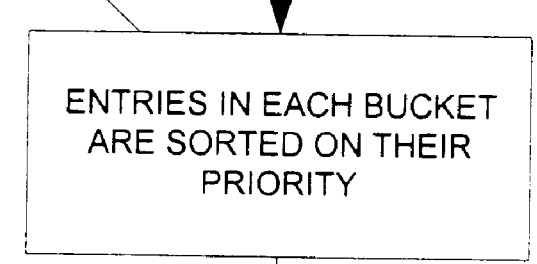
510 — ENTRIES IN EACH BUCKET ARE SORTED ON THEIR PRIORITY
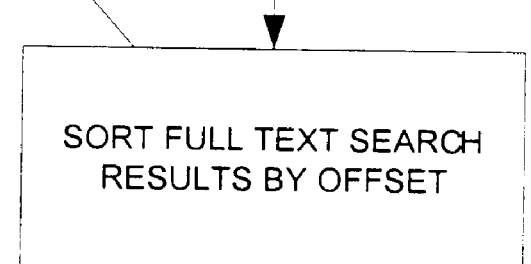
515 — SORT FULL TEXT SEARCH RESULTS BY OFFSET

NLP TRANSLATES THE QUERY "whales" TO GET THE LABELS FOR THE IMPORTANT WORDS. NLP INDICATES THAT
whale = dsub

710

PRIORITY RULES APPLIED TO TOKENS. FIND THAT ORDER IS: dsub. THUS PRIORITIZE TOKENS: whale.

715

WORD CLUSTER FOR "whale" APPLIED.

1005 — USE THE NLP TO TRANSLATE THE SENTENCE "How do whales catch food?" TO GET THE LABELS FOR THE IMPORTANT WORDS. NLP INDICATES THAT how = manner; whale = dsub; eat = root-verb; food = dobj.

1010 — APPLY PRIORITY RULES TO LABELED TOKENS TO PRIORITIZE TOKENS. FIND THAT ORDER IS: dsub; dobj; root-verb; manner. THUS PRIORITIZE TOKENS: whale; food; eat; how.

1015 — APPLY WORD CLUSTER FOR EACH TOKEN

METHOD AND SYSTEM FOR SEARCHING INDEX DATABASES

FIELD OF THE INVENTION

The present invention relates to computer search mechanisms, and more particularly to computer searching mechanisms that search indexes.

BACKGROUND OF THE INVENTION

Search engines are remote access programs that enable users to search for documents from a body of information (i.e., a database of documents or the Internet). Typically, a search engine searches a database for specific key words and retrieves a list of documents that contain the key words. Search engines can use algorithms to create indexes such that, ideally, only meaningful results are returned for each query. The indexes are arrangements or outlines of topics listed in a rational order.

There are multiple query styles commonly used by search engines. For example, topic-based queries (i.e., "Mexico"), topic/subtopic queries (i.e., "Mexico Cancun"), and Boolean queries (i.e., "Mexico OR Cancun") are commonly used query styles. Savvy users can build their own Boolean queries and can also use quotation marks to build literal strings with spaces. Search engines ineffectively interpret these query styles because they often result in the retrieval of documents that are too broad for the user's purpose or irrelevant to the user. In addition, the topic/subtopic query can be unpredictable because some search engines will do an "AND" search, and some search engines will do an "OR" search.

There is a need to better search and retrieve relevant documents using the above query styles. In addition, there is a need to better search and retrieve relevant documents using more complicated query styles, such as sentence-based queries (i.e., "I need info on the history of Mexico"), question queries (i.e., "Who is the president of Mexico?"), and essay question queries (i.e., "What are the significant events that led to the formation of Mexico?"). Search engines do not effectively understand these query styles because search engines limit searches by the words literally appearing in the query (i.e., "what, the, that"). Natural language processors (NLPs) have been helpful because they can help identify key words in these types of queries. However, NLPs are not able to prioritize the key words. In addition, if all important key words cannot be matched, there is no thoughtful mechanism for searching a reduced or simpler form of the query.

There is an additional need in the prior art to more effectively search for results for content queries. Requests for a specific type of content (i.e., "I want pictures of Mexico") require interpreting the query in two ways. First, the topic (i.e., "Mexico") must be identified. Second, the type of content desired (i.e., "pictures") must be identified. Content types can include pictures, maps, news magazine articles, and sounds, and can be described in any number of ways by users.

Once a query is understood, there is a need to more effectively search a body of information, often in the form of a database. In the prior art, the body of information may be a full text database consisting of all the target content or a key word database associated with the key words of the target content. Results for searching a full text database and a key word database often produce results that are too numerous, irrelevant, and disorderly to be useful without extensive post-search processing. In addition, searching a key word database is limited by the number of key words that exist and their unstructured nature. To find a match, queries must match a key word literally or match the key words found using NLPs. Users must anticipate the limited set of key words under which the content is listed.

In order to help users search databases, some search engines have allowed users to navigate an outline or hierarchical index to find the specific information they want. Although this option is useful, the outlines and hierarchical indexes have been complicated and have defied current user expectations that they should be able to ask a question and get relevant answers.

In light of the above limitations, there is a need for a search engine that better understands multiple query styles. Once the query is understood, there is a need for a search engine that more effectively searches a body of information. There is also a need for a search engine that presents the matched information in a way that is easily understood by the user, and ranks and sorts the matches according to their relevancy.

SUMMARY OF THE INVENTION

The present invention can solve the above problems by providing a search engine to better match user requests for information. The search engine allows users to search and retrieve information from a body of information, such as a database. It can lead users with general or specific queries to general or specific content in the body of information. Users can be directed to general information, such as the start of a long article, or to specific content within that article. An article outline and related articles can also be navigated. An effective process can search multiple query styles and can find relevant matches. It can analyze the user's query to determine its most important and less-important elements. Users can form their queries in an ad-hoc, free-form manner and still get relevant results. Queries can also be processed in a way that allows for quick results and an efficient use of server resources.

This novel treatment of hierarchical index data can be combined with a NLP to provide more accurate and detailed access to indexed content. For example, the body of information to be searched can be compiled in such a way that searches can be limited to relevant information. User queries can be analyzed in a way that determines the most-important and least-important elements by prioritized clustered tokens. Tokens can consist of a word or multiple words recognized as one entity. The NLP can recognize the important tokens in the query. Clustered tokens can be created by adding a family of related or alternative words and phrases, called word clusters, similar to the token. The clustered tokens can be summarized and combined in a single content catalog of indexes, called a lookup table. Prioritized clustered tokens can be created by prioritizing the clustered tokens according to priority rules that utilize the NLP to identify the importance of key words.

Where matches for all important words of the query cannot be found, less important prioritized clustered tokens can be cut from the query, and the query search can then be repeated using the more important prioritized clustered tokens. The matched information can be ranked and sorted according to relevancy by taking advantage of the knowledge of which prioritized clustered tokens are the most important. A tight feedback loop can enable designers to understand what users want and monitor on-going changes in user information needs.

The present invention can include three main segments: the Index Databases, the Run Time Search Component Object Module ("Search COM"), and the Active Server Page User Interface ("ASP UI"). The Index Databases can include a searchable database containing indexes from a plurality of information sources. The Search COM can be a search component that searches for search terms in the queries. The ASP UI can receive search terms from a user of the computer system.

The Index Databases can include a ContentBuild Database, which collects the various indexes and puts them in a searchable database. There can be numerous indexes or fields in the ContentBuild Database. The ContentBuild Database can include a Full Text Index that is used for performing full text searches. The ContentBuild Database can also include a WordWheel, which is a lookup table. The lookup table consist of rows and columns of data. The lookup table is examined either horizontally or vertically and the data that is sought is retrieved.

The Search COM can include the ResultsList, the Exact Match Search, the NLP, and the Full Text Search. The ResultsList is a results database that can hold all the matches or results from the search. The Exact Match Search can search for an exact match to the query. The NLP can be used for syntactic and semantic analysis of English sentences. The Full Text Search can be responsible for doing a search given a query and returning a weighted set of results.

The user can enter the query in a browser that sends the request to the Web server where the ASP UI retrieves it. The query can then be processed into prioritized clustered tokens using the NLP and token priority rules. The ResultsList can then be emptied. The Exact Match Search can next be performed in the WordWheel using the original query (not the tokens) to determine if the original query matched exactly any entries in the WordWheel. The Full Text Search can next be performed in the ContentBuild Database using the prioritized clustered tokens. The matches can then be sorted on offsets (a scoring criterion that recognizes the explicit hierarchy of index entries) and the matches can be moved to the ResultsList. The matches can be displayed in the ResultsList in a prioritized order on the ASP UI.

DESCRIPTION OF THE DRAWINGS

FIG. 5 illustrates an exemplary process for sorting the matches on offsets and moving the matches to the ResultsList.

FIGS. 6–8 are flowcharts illustrating an example of a one-word query: "whales".

FIGS. 9–11 are flowcharts illustrating an example of the query: "How do whales eat food?".

FIGS. 12–16 are screen shots illustrating exemplary screen displays for the query "whales".

DETAILED DESCRIPTION OF THE INVENTION

The present invention solves the above problems by providing a way to better match user requests for information. It leads users with general or specific queries to general or specific content or interest. Users are directed to general information, such as the start of a long article, or to specific content within that article. This allows users to form their queries in an ad-hoc, free-form manner and still be assured of getting the best possible results.

This novel treatment of hierarchical index data is combined with the NLP to provide more accurate and detailed access to indexed content. For example, the body of information to be searched is compiled in such a way that searches can be limited to relevant information. User queries are analyzed in a way that determines the most-important and least-important elements by prioritized clustered tokens. Tokens are a word or multiple words recognized as one entity. The NLP recognizes the important tokens in the query. Clustered tokens are created by adding a family of related or alternative words and phrases, called word clusters, similar to the token. The clustered tokens are summarized and combined in a single content catalog of indexes, called a lookup table. Prioritized clustered tokens are created by prioritizing the clustered tokens according to priority rules that utilize the NLP to identify the importance of key words.

The user enters the query in a browser that sends the request to the Web server where an ASP UI retrieves it. The query is then processed into prioritized clustered tokens. A ResultsList can then be emptied. An Exact Match Search can next be performed in a WordWheel using the original query (not the tokens) to determine if the original query matched exactly any entries in the WordWheel. A Full Text Search can next be performed in a ContentBuild Database using the prioritized clustered tokens. The matches can then be sorted on offsets and the matches can be moved to the ResultsList. The matches can be displayed in the ResultsList in a prioritized order on the ASP UI.

Architecture

Figure 1:
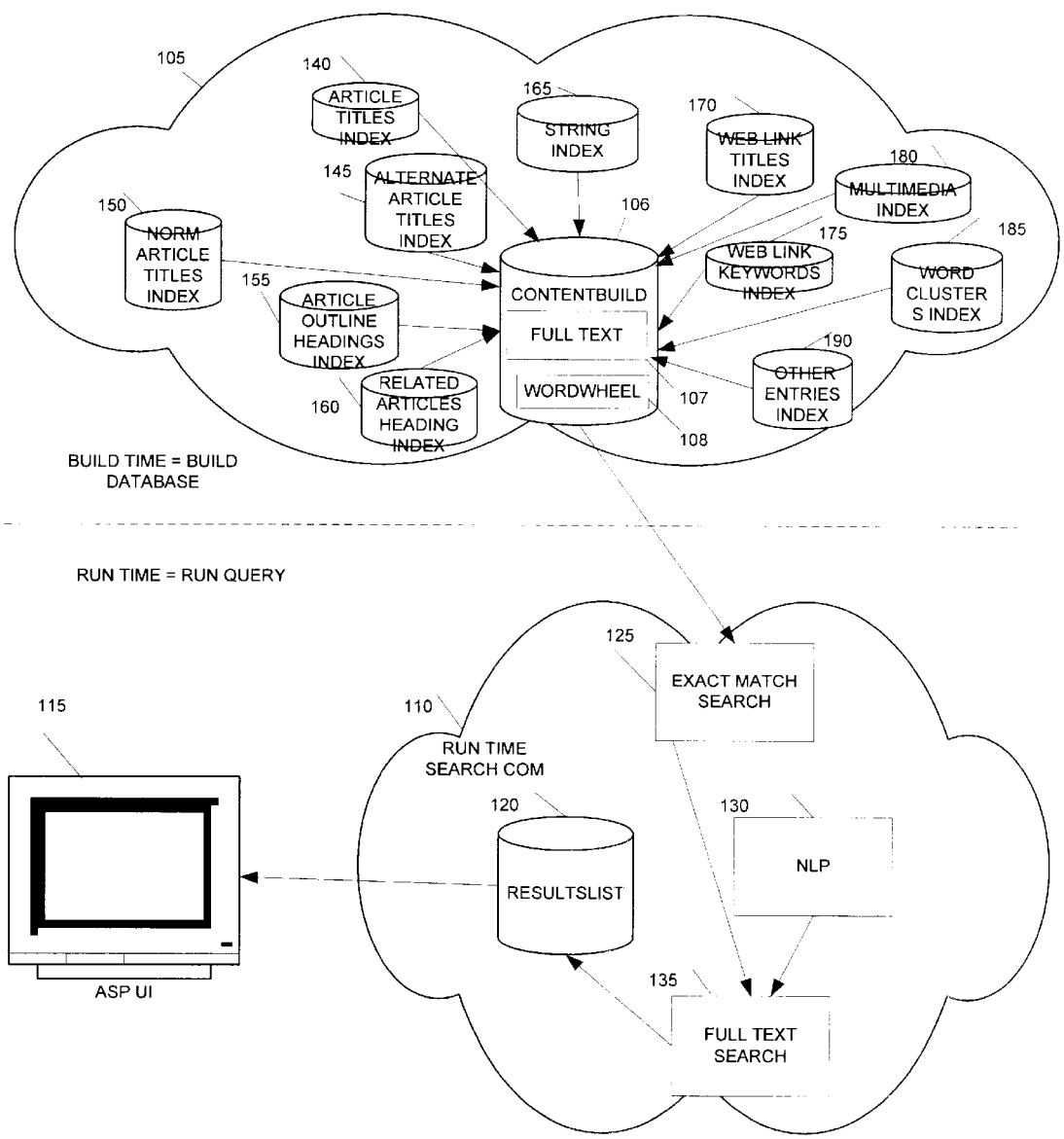
FIG. 1 displays the underlying architecture of an exemplary embodiment of the present invention.

FIG. 1 displays the underlying architecture of the present invention. The present invention includes three main segments: the Index Databases 105, the Run Time Search Component Object Module ("COM") 110, and the Active Server Page User Interface ("ASP UI") 115. The Index Databases 105 are built in build time and used in run time. The ASP UI 115 and the Search COM 110 are used in run time. The Search COM 110 includes the ResultsList 120, the Exact Match Search 125, the NLP 130, and the Full Text Search 135.

Index Databases

The Index Databases 105 include a ContentBuild Database 106, which collects the various indexes and puts them in a searchable database. There can be numerous indexes or fields in the ContentBuild Database 106. The ContentBuild Database 106 can include a Full Text Index 108 that is used for performing full text searches. The ContentBuild Database can also include a WordWheel 107. The Full Text Index 108 collects the various indexes and puts them in a searchable database. There are numerous indexes or fields in the Full Text Index 108, comprising: Article Titles Index 140, Alternate Article Titles Index 145, Normalized Article Titles Index 150, Article Outline Headings Index. 155, Related Article Headings Index 156, Hierarchical Index 160, String Index 165, Web Link Articles Index 170, Web Link Key words Index 175, Multimedia Index 180, Word Clusters Index 185, and Other Entries Index 190.

The Article Titles Index 140 includes titles of articles, such as "Kennedy, John Fitzgerald". The Alternate Article Titles Index 145 includes alternate titles of articles, such as "JFK". Normalized Article Titles Index 150 are normalized versions of articles, such as "John Fitzgerald Kennedy". The Article Outline Headings Index 155 includes titles of sections of articles, such as "Early Life" as a section in a "Kennedy, John Fitzgerald" article. The Related Article Headings Index 156 is a set of entries that point to articles that are related to the article. For example, a "John Fitzgerald Kennedy" article could have a related article "Successor", that points to the "Johnson, Lyndon Baines" article. The Hierarchical Index 160 includes hierarchically arranged entries that provide many more additional hooks into articles than what is possible with using just article titles. For example, "President John F. Kennedy" can be an index key word that points to a "Kennedy, John Fitzgerald" article. The String Index 165 is the same index as the Hierarchical Index, but presents the entries in a string instead of a hierarchical format. The Web Link Articles Index 170 includes titles of Web sites associated with the articles, such as a "John F. Kennedy University" Web site. The Web Link Key words Index 175 includes entries that provide more hooks into article Web links. An example is "JFK: John Fitzgerald Kennedy Library". The Multimedia Index 180 points to the multimedia (i.e., pictures) pages of the articles. An example is "Kennedy, John Fitzgerald: multimedia items", which would show pictures of JFK, or provide sound bites from JFK. The Word Clusters Index 185 is an index that provides the word clusters. The Other Entries Index 190 includes all other entries not included in the other indexes.

The WordWheel 107 is a lookup table. The lookup table consist of rows and columns of data. The lookup table is examined either horizontally or vertically and the data that is sought is retrieved.

Search COM

The Search COM 110 includes the ResultsList 120, the Exact Match Search 125, the NLP 130, and the Full Text Search 135.

ResultsList. The ResultsList 120 holds all the matches or results from the search. It then sorts and prioritizes them beyond where they were sorted in the ContentBuild Database 106.

Exact Match Search. The Exact Match Search 125 searches for an exact match to the query (although the words can be in a different order). This is a straight AND look-up of the terms. Thus, every word in the query, including stop-words will be sought. Generally 80% of the queries are one-word queries that the Exact Match Search 125 will find. If the user searches for a high-level key word, the user gets a pointer to full matching articles, and also pointers to the top level of the article outline and related items. This allows the user to search by a high-level key word, and then drill into the sub-area they want, without looking at all the material in between.

NLP. The NLP 130 is used for syntactic and semantic analysis of English sentences. This technology is used for processing user queries and converting them to prioritized clustered tokens. To achieve the prioritization, the grammatical/logical labeling done by the NLP 130 is evaluated with a set of priority rules unique to the Full Text Search 135. From this evaluation, the tokens of the original search query are arranged in declining order of importance. NLP 130 locates the key words of the query, so that the search is not thrown off by the rest of the words in the query. Most of the queries have only one or two tokens of interest. NLP 130 identifies those tokens of interest so they can be matched to appropriate results.

Full Text Search. The Full Text Search 135 is generally responsible for finding the other 20% of the queries. The Full Text Search 135 is responsible for doing a search given a query and returning a weighted set of results. The Full Text Search 135 uses the prioritized clustered tokens. Also, a weight is assigned to each search result. The weight of a search result is higher if it comes up in the early stages as compared to the later stages.

ASP UI

The ASP UI 115 is the code that runs on the Web server that generates the matches in HTML format. The matches are the search results. When the user types in the query, it calls the methods in the Search COM 110 objects and gets back the matches. It then generates HTML using the matches data. The matches are sorted and displayed in a prioritized order.

In addition to displaying the matches, the UI 115 includes a category for user feedback. For all matches, the Users have the ability to rate the matches and give brief comments on the matches. This mechanism will enable the programmers to get significant user feedback.

Key Concepts

The present invention combines indexes, prioritized search tokens, and word clusters to create a better end-user experience.

Indexes. Multiple types of indexes are used in the present invention. An index is a sequential arrangement or outline of topics listed in a rational order. An example of an index is a book index, with chapter and subchapter headings. The index can be similar to a tree structure. Each point in the index goes to a corresponding, very specific part of the an article using links. The links are pointers that connect two elements in a data structure together. A key innovation of the present invention is to treat the elements of a tree structure index as flat strings for efficient matching, but retaining knowledge of their hierarchical nature for priority ranking purposes. This flat string allows queries to be matched to index entries without extensive run-time processing to navigate a hierarchical arrangement. For example, the hierarchical index:

Cloth
   definition (pointing to Clothing article)
   eating disorder (pointing to Pica (medicine) article)
   fabric design
     (multiple entries at third level)
   moth damage (pointing to Clothes Moth article)
   plant fibers used
     Bowstring Hemp
     Breadfruit
     Ramie would be represented as:
   Cloth: definition: Clothing
   Cloth: eating disorder: Pica etc.

This index structuring allows direct access to answers which, in a conventional index presentation, the user would have to dig out by traversing a tree structure index and making multiple choices. A query such as "Is Pica the disease where people eat cloth?" can hit directly on the above entry without the user having to formulate his or her query to deal with the general subject of "Cloth", click on Cloth, and then click on "eating disorder". At the same time, the knowledge of that latent hierarchy helps compare and score results. As discussed in the explanation of offset scoring below, a hit on another entry, "Eating Disorders: types of eating disorders: eating cloth or dirt: Pica" would score lower than the "Cloth: eating disorder: Pica" entry because the hits are at lower levels of the index. This gives the system an additional way to rank competing results.

Prioritized Search Tokens. Tokens are a word, or multiple words recognized as one entity. The NLP 130 recognizes the important words in the query and designates these as tokens. The NLP 130 takes the query and removes the stop-words. NLP 130 first pulls out all the stop-words. Stop-words are words that can be thrown out of a query because they are of no use. Typical stop-words are: I, the, a, an, it, etc. The rest of the words are tokens. These can be one-word tokens or multiword tokens. For example, "New York" is one token. having the ability to look at words like "New York" as one term and not two different terms helps tremendously to narrow down the search. The NLP 130 then takes the remaining words, normalizes them, and matches them against the NLP database to label the remaining words in the sentence. The NLP 130 then diagrams the query and determines that the prioritization of the tokens using priority rules. The priority rules are rules that determine the importance of the tokens relative to each other by putting together a list of the labels and their priority relative to each other.

Prioritized Clustered Tokens. In addition to being prioritized, the tokens are clustered using word clusters. Word clusters make it easier to find appropriate matches for the queries. Word clusters are families of related words. The word clusters are done at build time. Creating the word cluster for a particular word can be as easy as removing the trailing "S", or trailing "ED". Because the NLP 130 normalizes many of the terms, the word clusters will also add normalized terms. The notion of word clusters is much more flexible than synonyms because the goal is to match appropriate query words to index words, which is a fuzzier notion than synonyms. An example of a word cluster is [author, writer, wrote, novelist]. If any entry of the index contains a word that belongs to the word cluster, then all the remaining entries of the word cluster are added to the entry. For example, if a user is searching for "writer of Moby Dick", this information is indexed as "Moby Dick (novel): author" so the question is how to match the query with the index. This is done by creating the word cluster that has words such as "author", "writer", and "wrote". Instead of running a query three times, one with "Who wrote Romeo and Juliet?", one with "Who authored Romeo and Juliet?" and once with "Who was the writer of Romeo and Juliet?", the user can run only one of these queries, and the present invention will find the other related terms.

Overview

Figure 2:
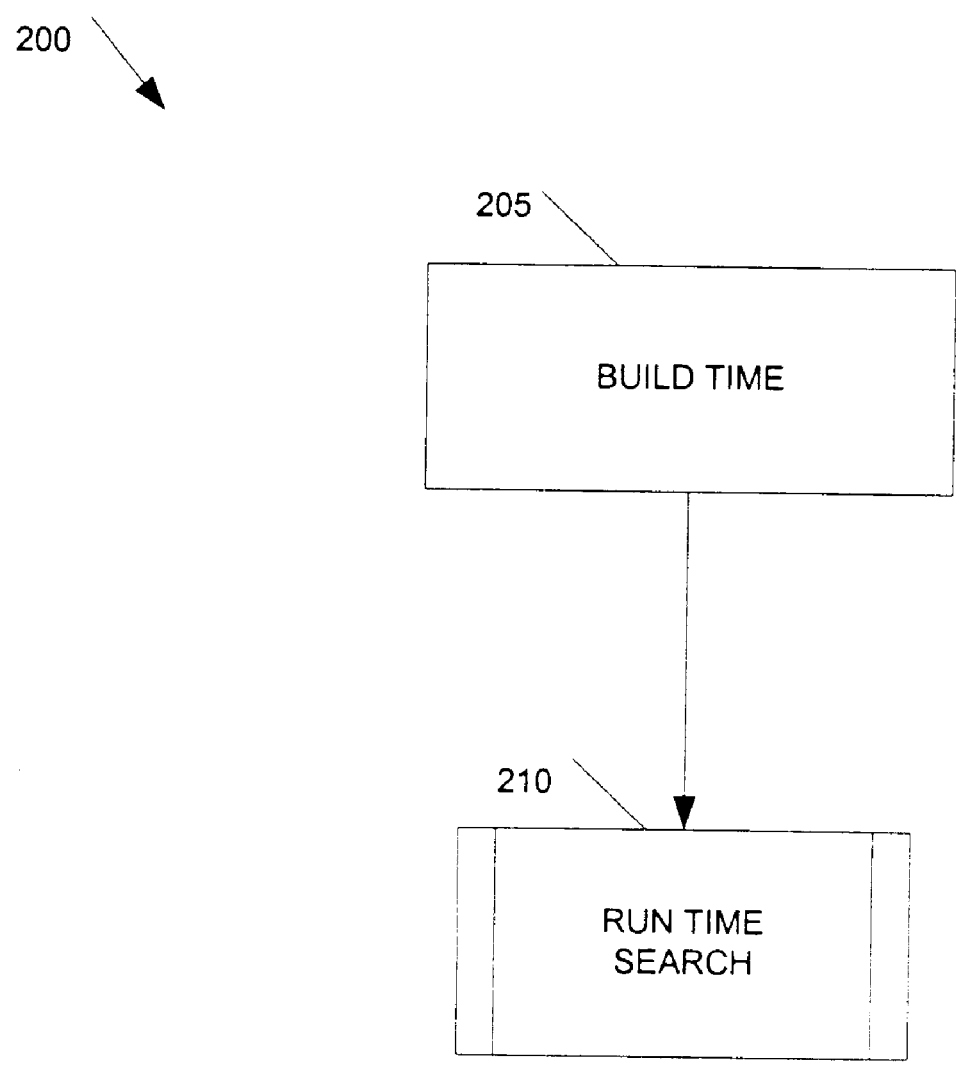
FIG. 2 indicates the two modes in an exemplary embodiment of the present invention.

FIG. 2 indicates the two modes for the present invention. Step 205 represents the build time for the content, where the ContentBuild Database 106, the Full Text Index 107, and the WordWheel 108 are built. Step 210 represents the run time search.

Run Time Overview

Figure 3:
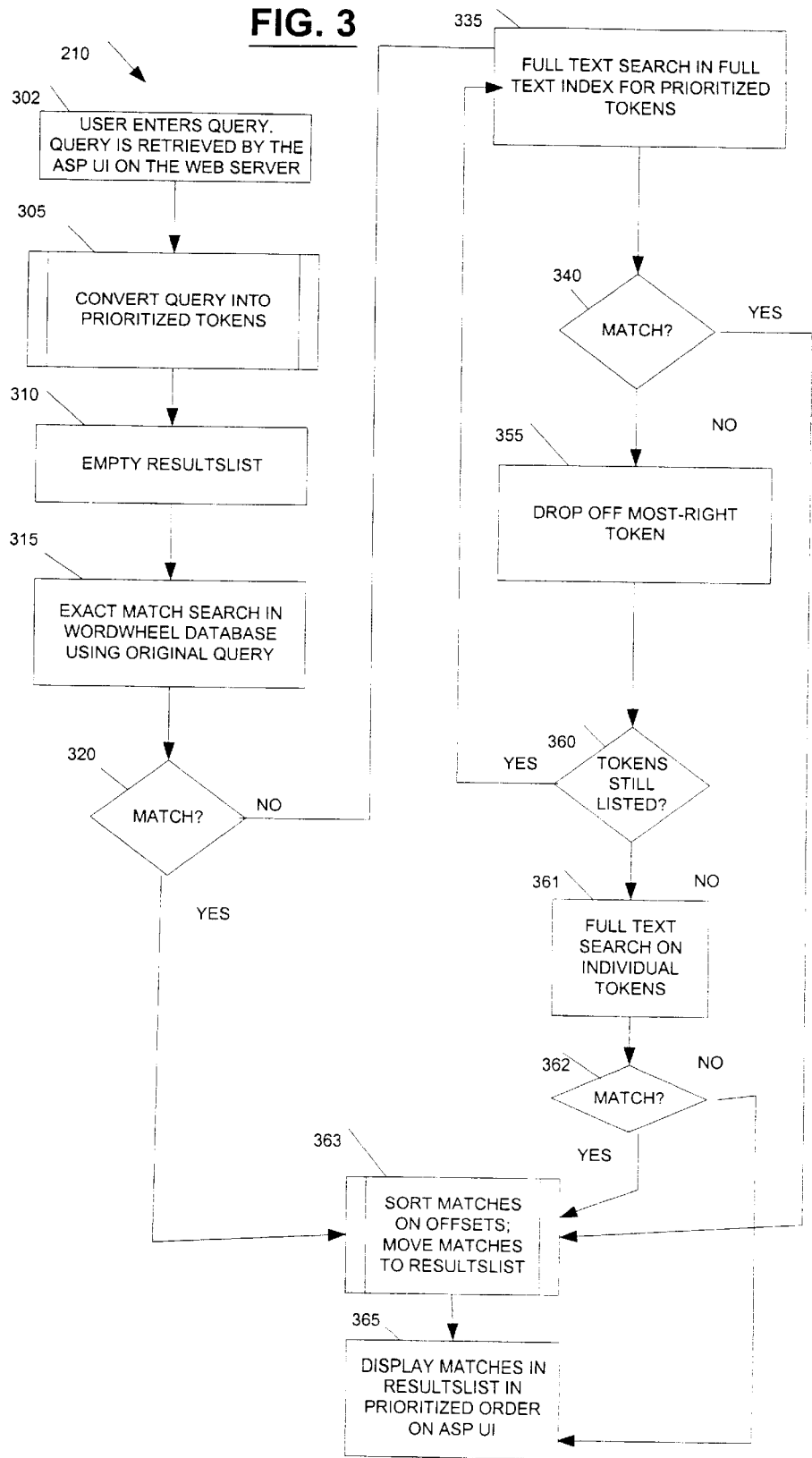
FIG. 3 is a flow chart illustrating the run time overview in an exemplary embodiment.

FIG. 3 is a flow chart illustrating the run time overview in an exemplary embodiment. In step 302, the user enters the query in a browser that sends the request to the Web server here the ASP UI 115 retrieves it. In step 305, the query is processed into prioritized clustered tokens. In step 310, the ResultsList 120 is emptied. In step 315, the Exact Match Search 125 is performed in the WordWheel 107 using the original query words (not the tokens). The Exact Match Search 125 is run to determine if the original query matched exactly any entries in the WordWheel 107. In step 320, it is determined if a match has occurred. If the answer is "YES", and a match has occurred, the process moves to step 363. Only the first 50 matches are accepted. If the answer is "NO", and a match has not occurred, the process moves to step 335. In step 335, the Full Text Search 135 is performed in the Full Text Index 108 using the prioritized clustered tokens. In step 340, it is determined if a match has occurred. If the answer is "YES", and a match has occurred, the process moves to step 363. If the answer is "NO", and a match has not occurred, the process moves to step 355. In step 355, the most-right prioritized clustered token (i.e., the least important according to the priority rules) is removed. In step 360, it is asked if any prioritized clustered tokens are still listed. If the answer is "YES", the process moves back to step 335, where a new search is performed on the remaining prioritized clustered tokens. If the answer is "NO", the process moves to step 361. In step 361, a fall-through search is conducted. This is when a Full Text Search 135 is performed in the Full Text Index 108 on each individual token. In step 362, it is determined if a match has occurred. If the answer is "YES", and a match has occurred, the process moves to step 363. In step 363, the matches are sorted on offsets and the matches are moves to the ResultsList 120. If the answer is "NO", and a match has not occurred, the process moves to step 365. In step 365, the search results are displayed in the ResultsList 120 in a prioritized order on the ASP UI 115.

Prioritized Clustered Tokens

Figure 4:
FIG. 4 illustrates an exemplary process for converting the query into prioritized clustered tokens.

FIG. 4 illustrates an exemplary process for converting the query into prioritized clustered tokens, as set forth in step 305 of FIG. 3. In step 405, the NLP 130 translates the query to get labeled tokens representing the most important words. The NLP 130 takes the query and removes the stop-words. Stop-words are words that can be thrown out of a query because they are of no use. Typical stop-words are: "I", "the", "a", "an", "it", etc. The rest of the words are tokens. These can be one-word tokens or multi-word tokens. For example, "New York" is one token. having the ability to look at words like "New York" as one term and not two different terms helps tremendously to narrow down the search.

For example, in the query "How do whales eat food?", "do" is a stop-word. Then the NLP 130 takes the remaining words, normalizes them, and matches them against the NLP database to label the remaining words in the sentence. In the query "How do whales eat food?", the NLP 130 determines that "how", "whales", "eat", and "food" are the important words. The NLP 130 then normalizes these words to get "how", "whale", "eat", and "food". The NLP 130 then diagrams the query and determines that "how" is a manner token (labeled "manner"), "whale" is a subject token (labeled "Dsub"), "eat" is a verb token (labeled "root verb"), and "food" is an object token (labeled "Dobj").

In step 410, the priority rules are applied to the labeled tokens. The priority rules are rules that determine the importance of the tokens relative to each other by putting together a list of the labels and their priority relative to each other. For example, the priority rules indicate the following hierarchy for the following labels:

Pcs
PrpCnjs
Mods
Dsub
Dadj
Dobj
Nadj
LocAt
Root-verb
Manner

These priority rules indicate that, for the query "How do whales eat food?", the labels are prioritized as follows: Dsub, Dobj, Root-verb, and Manner. Thus, the tokens are prioritized as follows: "whale (Dsub)", "food (Dobj)", "eat (Root-verb)", and "how (Manner)".

In step 415, the word clusters that were set up in build time are applied to the prioritized tokens to make prioritized clustered tokens. The word clusters ensure that words similar to the tokens are matches for the tokens. For the query "How do whales eat food?", the following word clusters match the prioritized tokens for the query "How do whales eat food?":

whale: Whale whales whale education whale facts whale food: (first set) food foods meal meals (another set) diet food eat feed eats nutrition eating dietary eaten feeds ate consume eat: diet food eat feed eats nutrition eating dietary eaten feeds ate consume how: none Sorting the Matches and Moving the Matches to the ResultsList FIG. 5 illustrates an exemplary process for sorting the matches on offsets and moving the matches to the ResultsList 120, as set forth in step 353 of FIG. 3.

The entries that are added to the ContentBuild Database 106 are sorted at build time using word count (primary sort key) and priority (secondary sort key). This is done at build time so the run time is more efficient. The entries are then sorted by offsets in run time.

Step 505 illustrates how the entries are first categorized into word count buckets. All entries with the same word count go into the same bucket. In step 510, the entries in each bucket are then sorted on their priority. The priority of an entry depends on its index family (Article Title Index, etc.). In step 515, the Full Text Search 135 results are sorted by offset (although the Exact Match 125 Search matches are not sorted by offsets).

Offset is a scoring criterion that recognizes the explicit hierarchy of index entries and section headings, and the implicit hierarchy of other titles and headings. Matches near the beginning of a catalog item are valued higher than matches near the end, and matches on the original words of an entry are valued higher than matches on alternates that have been added to entries by way of word clusters. The offset value of an entry is the sum of the offsets of each word. The offset is a number that represents the character position, word position and/or level at which a match was found. The position of matches to strings that make up the catalog can be measured by the character where the match begins, the word position where the match begins, or, if the string is made of hierarchical elements concatenated, the level where the match falls. The present invention can use all or some of these measures. An example follows where level and word count are used, with levels demarcated in the strings by colons and indicated in scores by increments of 100. A query of "whale hunting" matches these entries:

Whale: hunting (offset 101)
Whale: hunting for whales (offset 101)
Sperm Whale: ban on hunting (offset 202)
Hunting: animals that are hunters: whales (offset 20001)
Hunting: animals hunted for meat or hides: whales: Bowhead whales (offset 20001)

For "whale: hunting", the match is on the first word of level 1 (score 1) plus the first word of level 2 (score 100)=score 101. For "whale: hunting for whales", the scoring is similar. For "Sperm Whale: ban on hunting", the match is on the second word of level 1 (score 2) and the second non-stop-word of level 2 (score 200)=score 202. Expansion words from alternate word clusters can be considered an additional level or appended to the level whose words they expand. So the offset of "Whale: hunting" is lower than "Whale: hunting for whales" and "Whale: hunting" ranks higher in the ResultsList 120. Full Text Search 135 matches with the same offsets retain the build time sort order.

Example Query: "Whales"

Figure 6:
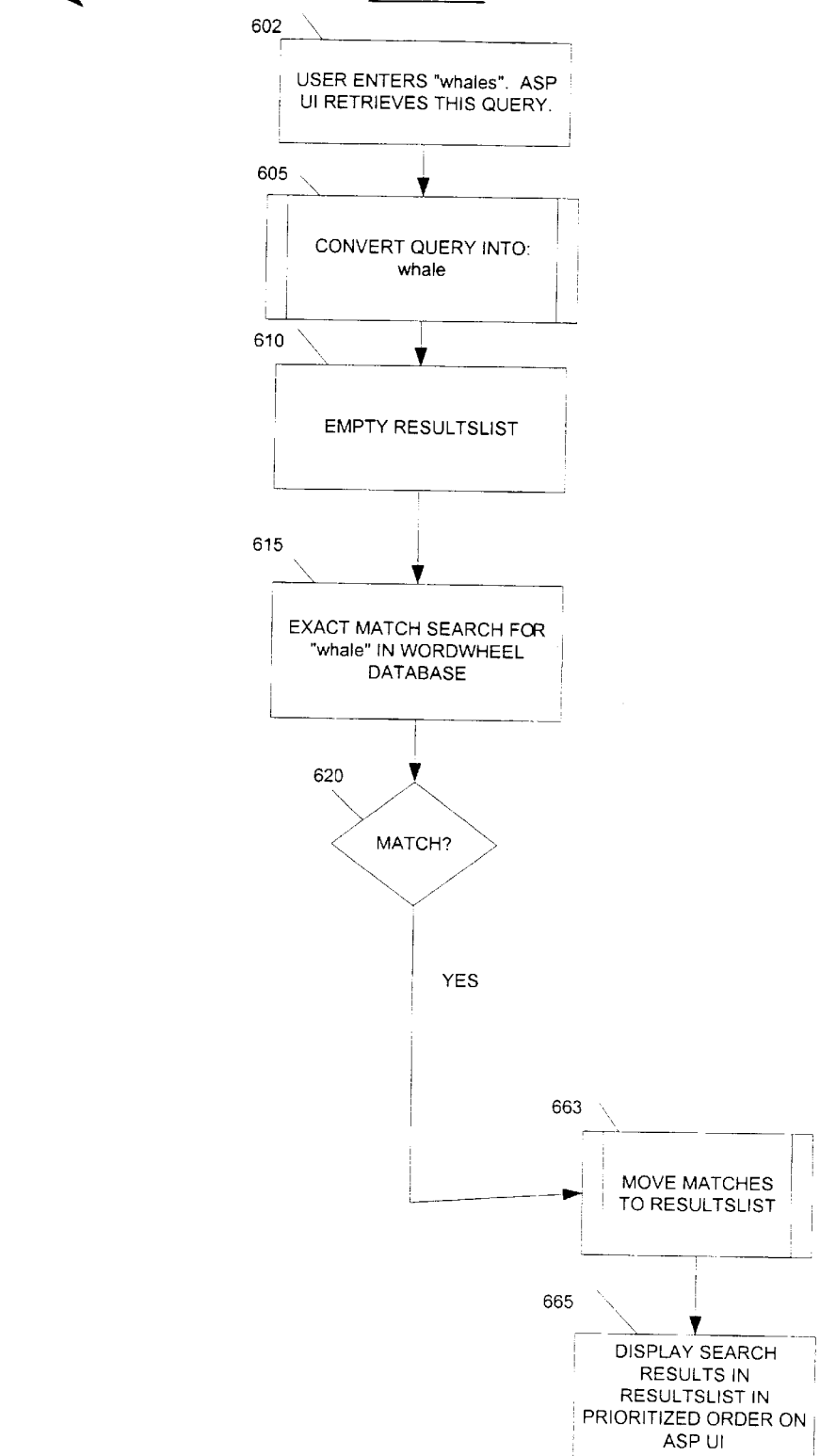
Figure 8:
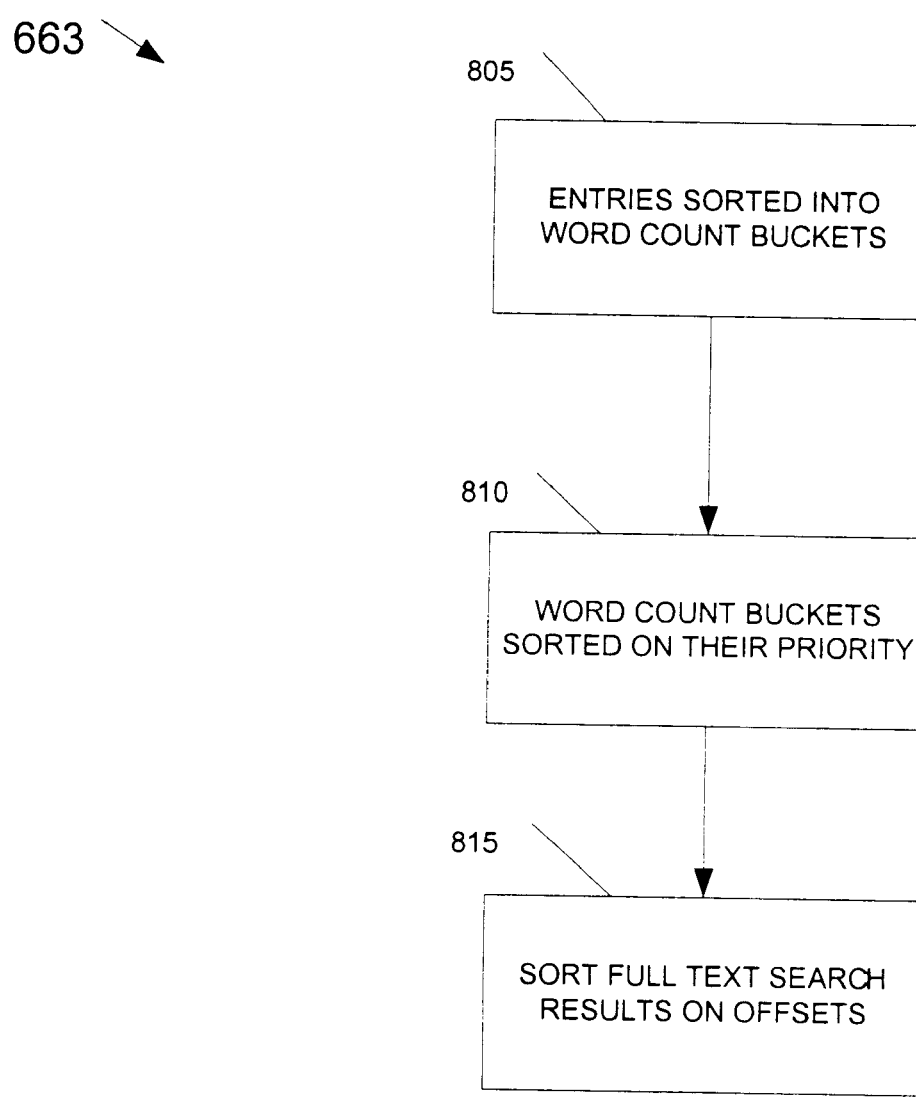

FIGS. 6–8 are flowcharts illustrating an example of a one-word query: "whales". FIG. 6 is a flowchart illustrating the run-time overview for this example. In step 602, the user enters the query "whales". In step 605, the NLP 130 converts the query to "whale". In step 610, the ResultsList 120 is emptied. In step 615, an Exact Match Search 125 is conducted in the WordWheel 107 to see if there is an exact match for the word "whale". In step 620, it is determined if there is a match. The answer is "YES", so the process moves to step 663. In step 663, the results are sorted by offsets and the matches are moved to the ResultsList 120. In step 665, the search results are displayed in a prioritized order on the ASP UI 115. In this case, the search result is a pointer to the full article on "Whales". The user also can access pointers to the top level of the "Whale" article outline and a related items indexes.

FIG. 7 is a flow chart diagram illustrating how the query "whales" is converted into prioritized tokens, as set forth in step 605. In step 705, the NLP 130 translates the query "whales" to get the labels for the most important words. This is done by taking out the stop-words (there are none in this example), breaking down or diagramming the remaining words to get the tokens (here "whales"), normalizing the tokens (change "whales" to "whale"), and labeling the tokens ("whale"=Dsub). In step 710, the priority rules are applied to the tokens to prioritize the tokens. Thus, as "Dsub=whale" is the only token, it is given top priority. Step 715 illustrates the word clusters as applied in build time. Each token has a word cluster or set of words that are used as a similar search term. For this example, the word cluster for whales follows:

whales=Whale whales whale education whale facts whale

FIG. 8 is a flow chart diagram illustrating an exemplary process for sorting results of the search "whales" by offsets and moving the matches to the ResultsList 120, as set forth in step 663 of FIG. 6. Step 805 illustrates how the entries are first categorized into word count buckets. All entries with the same word count go into the same bucket. In step 810, the entries in each bucket are then sorted on their priority. The priority of an entry depends on its index family (Article Title Index, etc.). In step 815, the Full Text Search 135 results are sorted on offsets (although Exact Match Search 125 matches are not sorted by offsets). Full Text Search 135 matches with the same offsets retain the build time sort order (sorted by word count and priority). For this single-word query, offset scoring amounts to this: Entries that begin with "whale" or "whales" have an offset of 1 and come first in results, sorted by length and priority. So "whale", the title of the article about whales, is first, then:

Whale: size
Whale: blubber
Whale: flippers
Whale: nostrils
Whale: migration
Whale: echolocation Etc.

This allows the shortest, most exact match of a query to be at the top of the search results. Storing the word count and priority also allows the present invention to produce an objective score signifying the degree of match by comparing the word count of the matched item to the word count of the processed query. This score can be used to designate especially good matches for the display.

Example Query: "How Do Whales Eat Food?"

Figure 9:
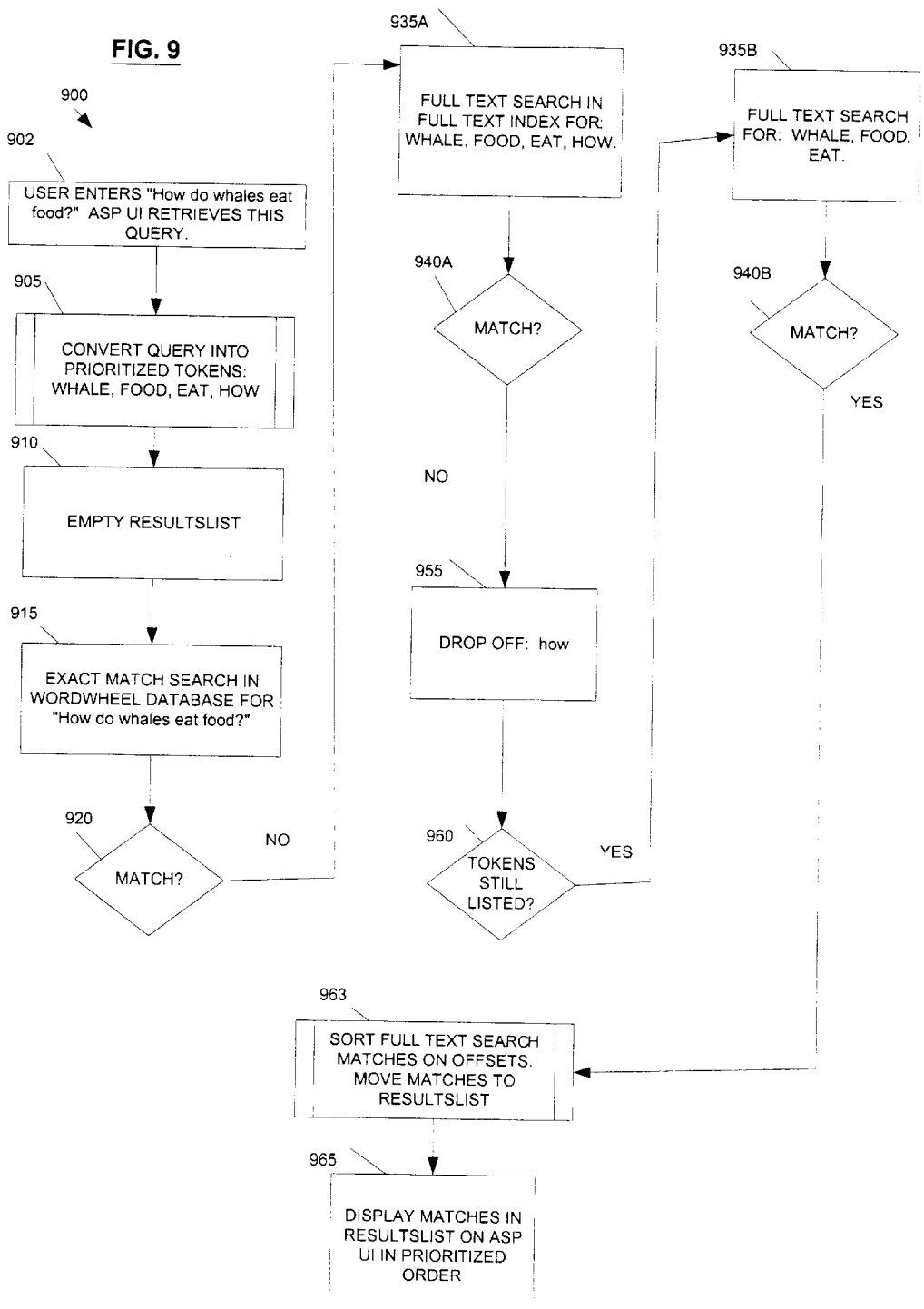
Figure 11:
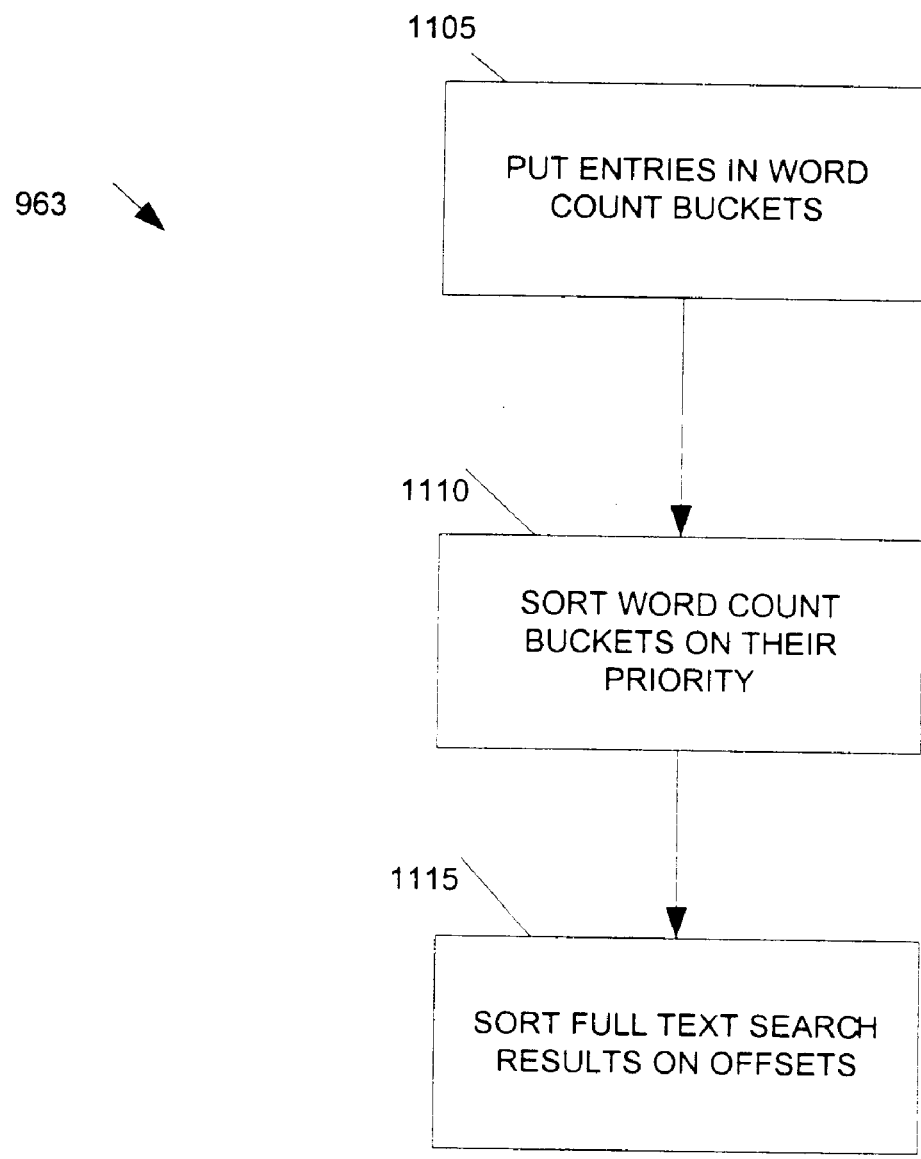

FIGS. 9–11 are flowcharts illustrating an example of the query: "How do whales eat food?". FIG. 9 is a flowchart diagram illustrating the overview process for the example query "How do whales eat food?" In step 902, the user enters "How do whales eat food?" and the ASP UI 115 retrieves this query. In step 905, the query "How do whales eat food?" is converted into the prioritized clustered tokens: "whale", "food", "eat", and "how". In step 910, the ResultsList 120 is emptied. In step 915, the Exact Match Search 125 is conducted in the WordWheel 107 to find an exact match in the indexes for "How do whales catch food?" In step 920, it is determined if there is a match. There is no match for the exact words "How do whales catch food?", thus the process moves to step 935A. In step 935A, a Full Text Search 135 is run in the ContentBuild Database 106 for the prioritized clustered tokens "whale", "food", "eat", and "how". Thus, a search is run to find "whale" and "food" and "eat" and "how". In step 940A, it is determined if there is a match. There is not a match, so the process moves to step 955, and the most-right, least important prioritized clustered token "how" is dropped. In step 960, it is determined if prioritized clustered tokens are still listed. Prioritized clustered tokens are still listed so the process returns to step 935 again, indicated on the flowchart as 935B. In 935B the Full Text Search 135 is run in the ContentBuild Database 106 for the prioritized clustered tokens "whale", "food", and "eat". Thus, a search is run to find "whale" and "food" and "eat". In step 940, it is determined if there is a match. There is a match this time, so the process moves to step 963. In step 963, the matches are sorted on offsets and moved to the ResultsList 120. In step 965, the matches in the ResultsList 120 are displayed on the ASP UI 115 in a prioritized order.

FIG. 10 is an exemplary process illustrating how the query "How do whales eat food?" is converted into prioritized clustered tokens, as set forth in step 905 of FIG. 9. In step 1005, the NLP 130 translates the query "How do whales eat food?" to get the labels for the most important words. This is done by taking out the stop-words (here the only stop-word is "do"), breaking down or diagramming the remaining words to get the tokens (here the tokens are "how", "whales" "eat" "food"), normalizing the tokens (change "whales" to "whale"), and labeling the tokens ("how=manner", "whale=Dsub", "eat=root-verb", and "food=Dobj"). In step 1010, the priority rules are applied to the tokens to prioritize the tokens. Using an exemplary priority rules list as described earlier, the priority of these labels follows: Dsub, Dobj, Root-verb, Manner. Thus, the tokens are prioritized as follows: "whale", "food", "eat", "how". Step 1015 illustrates that the word clusters are applied. Each token has a word cluster or set of words that are used as a similar search term. For this example, the word clusters for the tokens follows:

whale: Whale whales whale education whale facts whale food: (first set) food foods meal meals (another set) diet food eat feed eats nutrition eating dietary eaten feeds ate consume eat: diet food eat feed eats nutrition eating dietary eaten feeds ate consume how: none FIG. 11 illustrates an exemplary process for sorting results of the search "How do whales eat food?" by offsets and moving the matches to the ResultsList 120, as set forth in step 963 of FIG. 9. Step 1105 illustrates how the entries are first categorized into word count buckets. All entries with the same word count go into the same bucket. In step 1110, the entries in each bucket are then sorted on their priority. The priority of an entry depends on its index family (Article Title Index, etc.). In step 1115, the Full Text Search 135 results are sorted on offsets (although Exact Match Search 125 matches are not sorted on offsets). Exact Match Search 125 matches with the same offsets retain the build time sort order. This query hits on a single entry, "Whale: how whales eat". The tokens of the query are matched as follows:

Whale: matches on $1^{st}$ word

Food: matches on alternate word "food" for "eat"

Eat: matches on $3^{rd}$ word of second level

How: matches on $2^{nd}$ word of second level

If it had failed to find such an entry, it would have sought a match on "whale food eat", then "whale food", then "whale" or "food".

Example Screen Shots for Query: "Whales"

Figure 12:
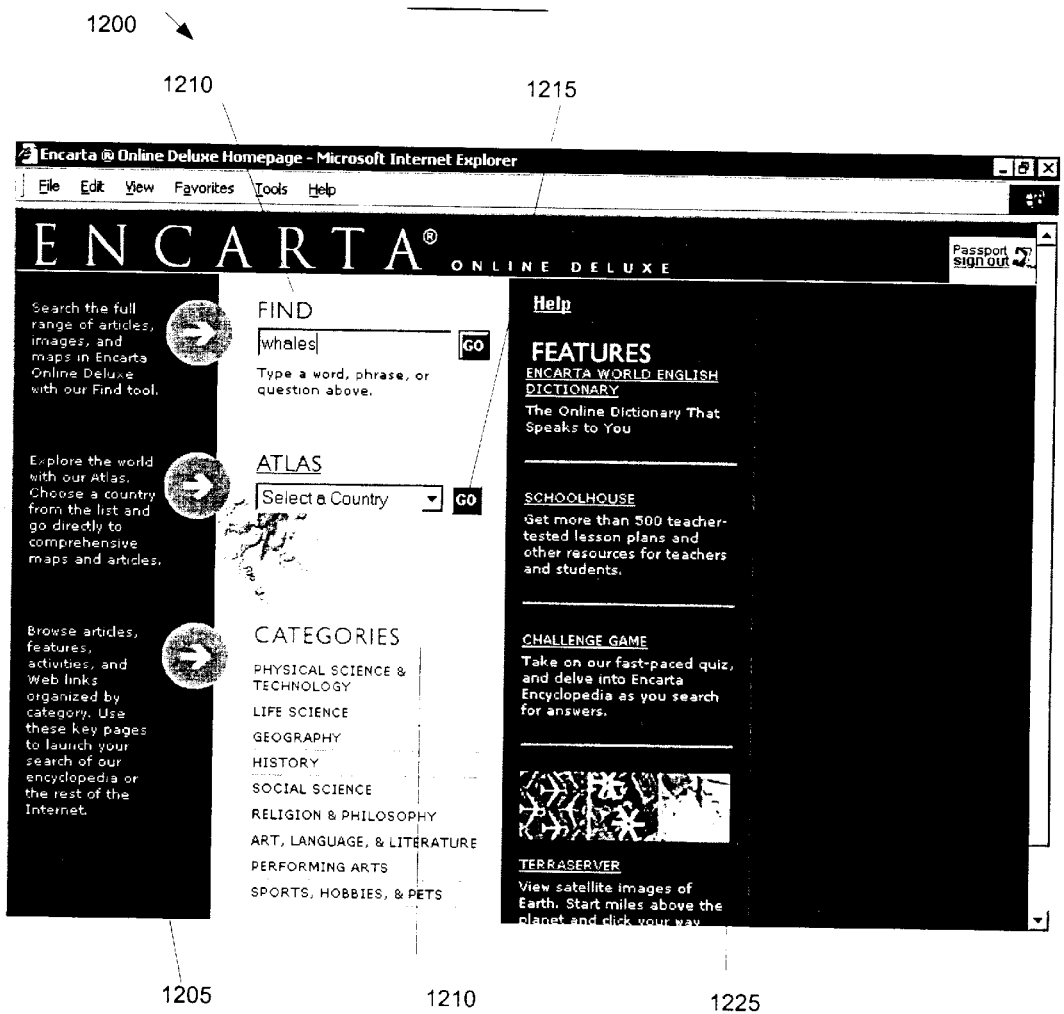

FIGS. 12–16 are screen shots illustrating exemplary displays for the query "whales". FIG. 12 is a screen shot 1200 illustrating an exemplary display for the query "whales". The Find 1210 allows the user to enter the query "whales" and press the "GO" button. The Atlas 1215 and Categories 1220 allow the user to search using other mechanisms. Short explanations of the Find 1210, the Atlas 1215, and the Categories 1220 are provided in the Explanation 1205. Additional Features 1225 are also provided, giving the user access to an Online Dictionary, Schoolhouse Lesson Plans, and a Challenge Game.

Figure 13:
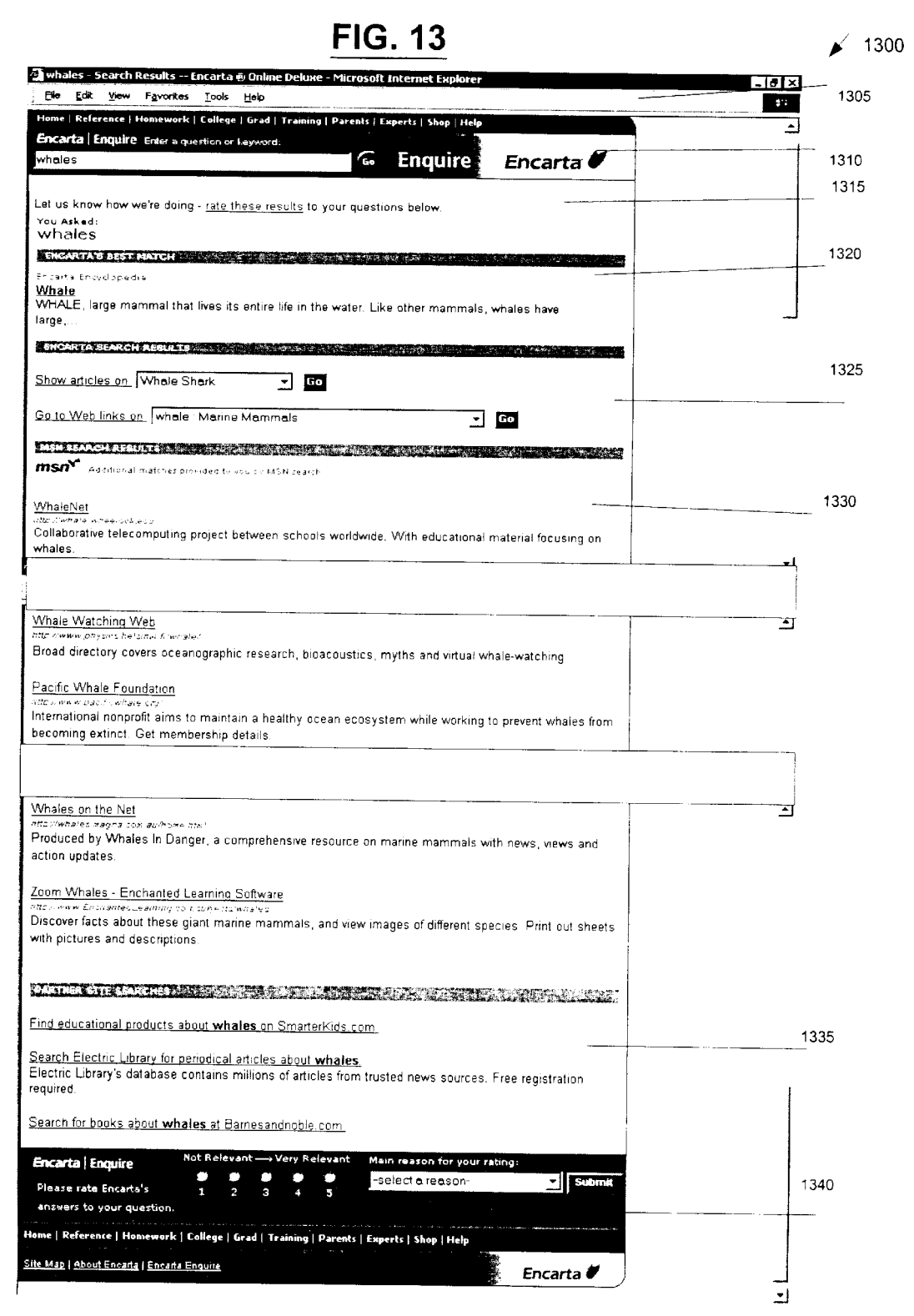

FIG. 13 is a screen shot 1300 illustrating exemplary matches for the query "whales". The query "whales" is displayed in the Full Text 1305. The Rate These Results 1310 allows the user to jump to the bottom of the page to the Rating Questions 1340, where the user can indicate how relevant the matches were, and the reason for the rating. The You Asked 1315 also displays the query "whales". Best Match 1320 provides the link to the article that is the best match. In this case, the Best Match 1320 is an articles entitled "Whale". Search Results 1325 provides the links to other matches, including articles and Web links. Search Results 1330 provide matches to other links. Partner Site Searches 1335 provide links to educational products, periodical articles, and books.

Figure 14A:
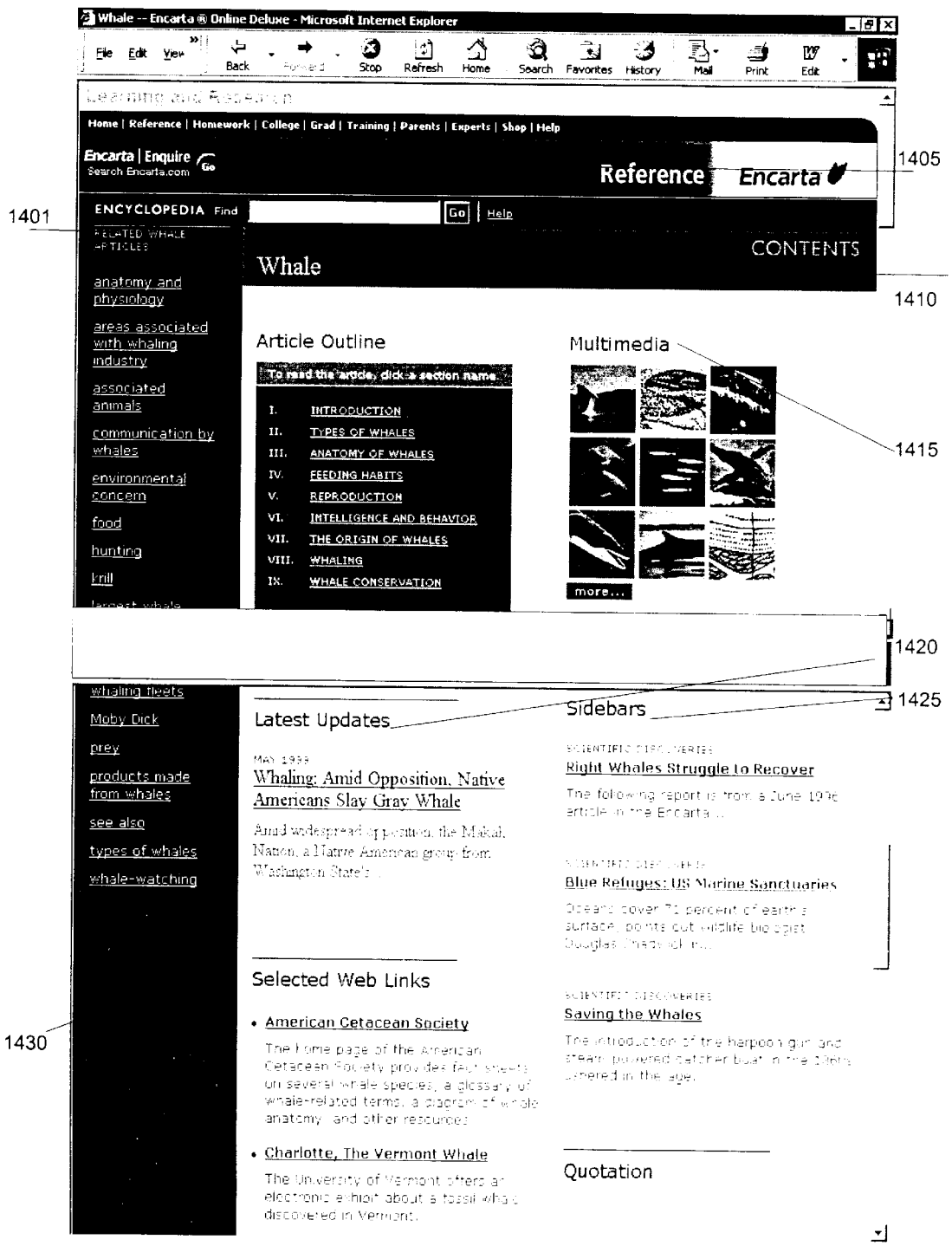
Figure 14B:
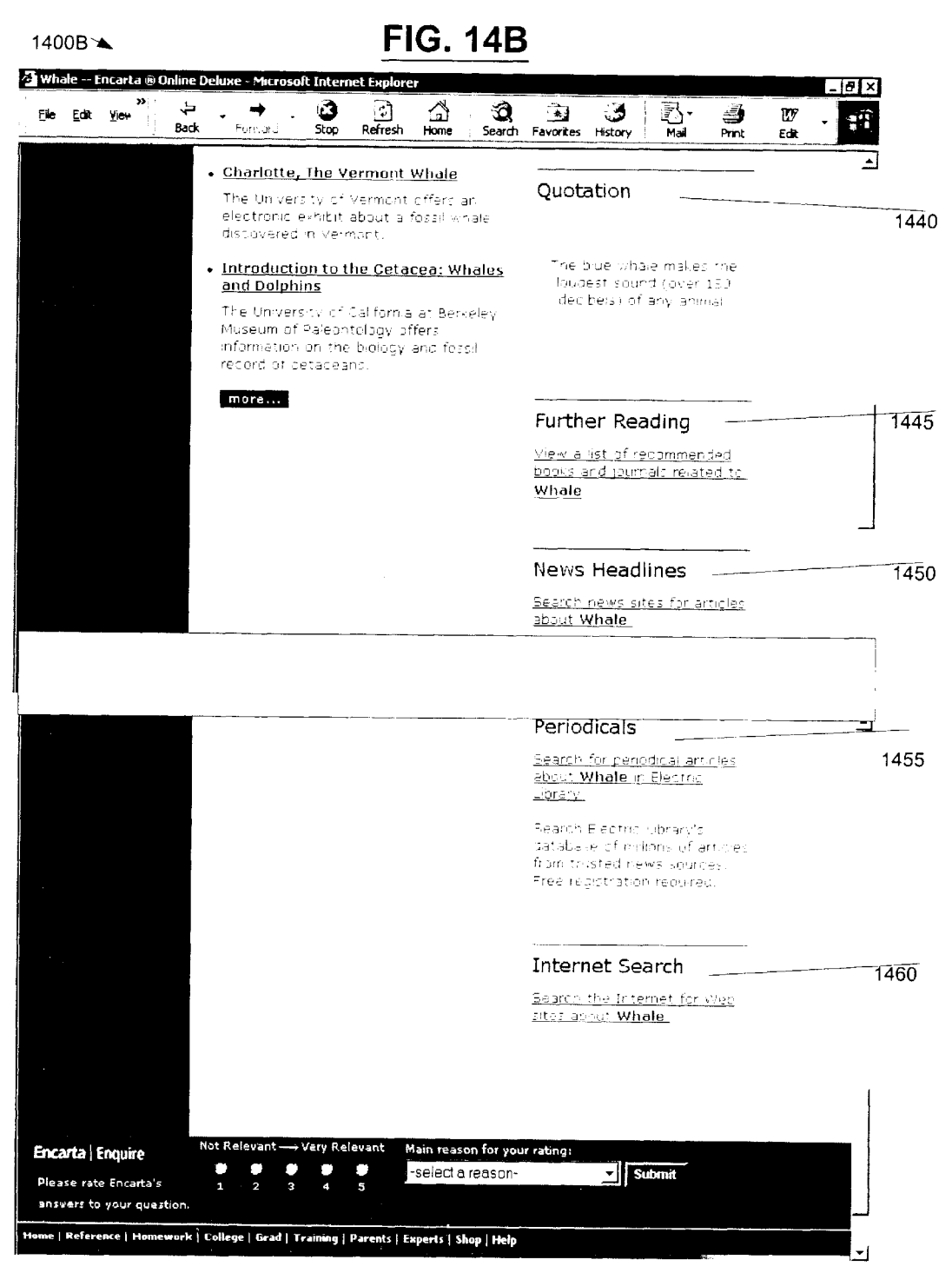

FIGS. 14A and 14B, together comprising FIG. 14, are screen shots 1400A and 1400B illustrating an exemplary display for the Best Match 1320 for the query "whale". The Contents 1405 displays the article title: "Whale". The Related Articles 1401 displays the Related Articles Heading Index 160. The Article Outline 1405 displays the Article Outline Headings Index 155. The Multimedia 1415 displays the contents of the Multimedia Index. The Latest Updates 1420 displays recent articles. The Sidebars 1425 display scientific discovery articles. The Selected Web Links 1430 display links to relevant Web sites. The Quotation 1440 displays an interesting quote. The Further Reading 1445 provides links to recommended books and journal. The News Headlines 1450 searches news sites for related articles. The Periodicals 1455 searches for related periodical articles. The Internet Search 1460 searches the Internet for related sites.

Figure 15:
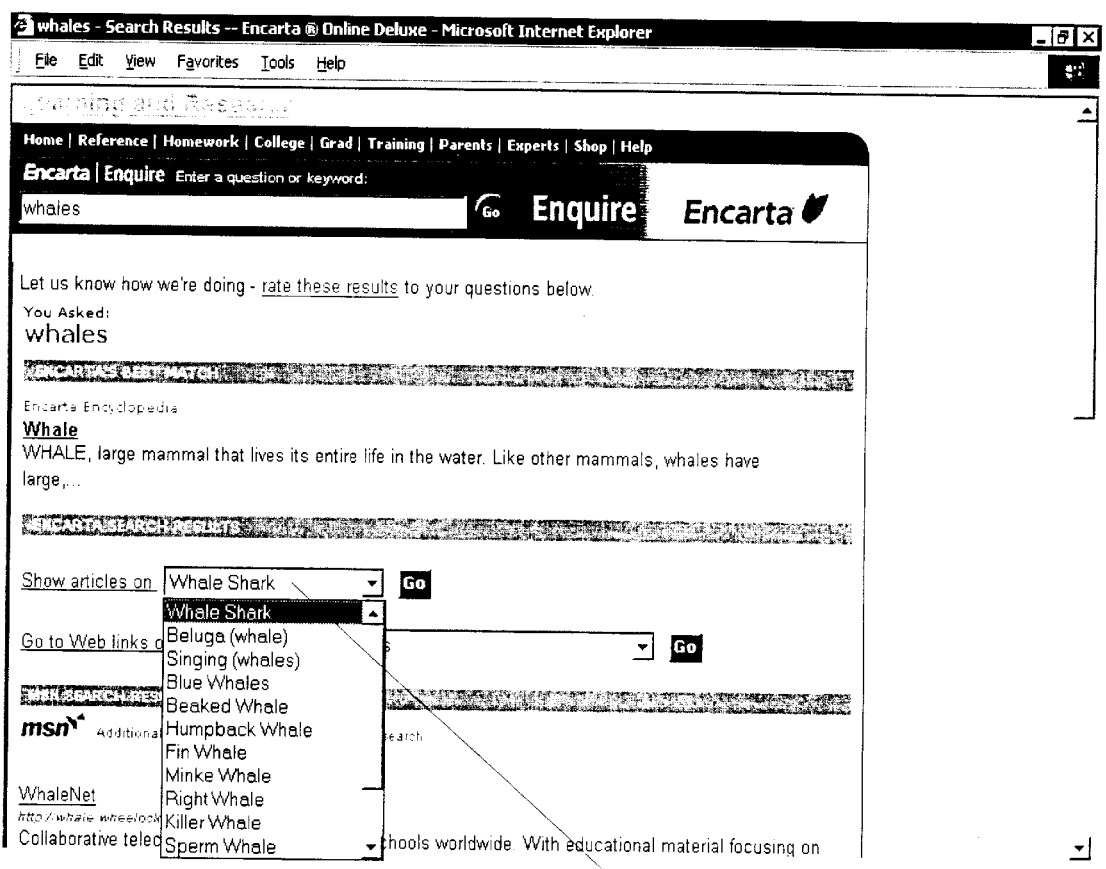
Figure 16:
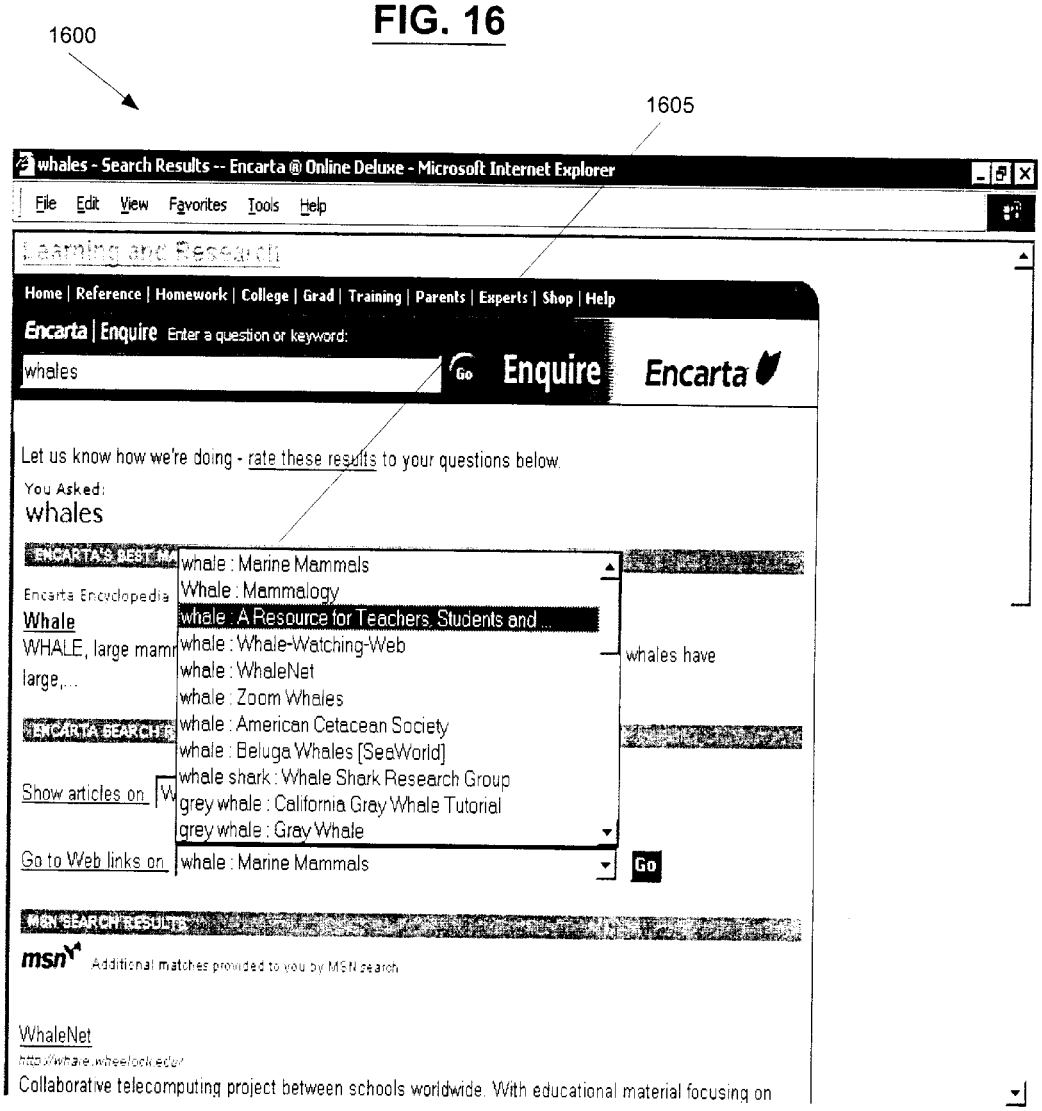

FIGS. 15 and 16 are screen shots 1500 and 1600 illustrating exemplary embodiments of the screen shot 1300 that displays matches for the query "whales". Show Articles 1505 displays the different articles on the different kinds of whales. The Go To Web Links 1605 indicates entries from the Web Links Index, and displays links to different web sites on the different kinds of whales.

Example Screen Shots for Query: "How Do Whales Eat Food?"

Figure 17:
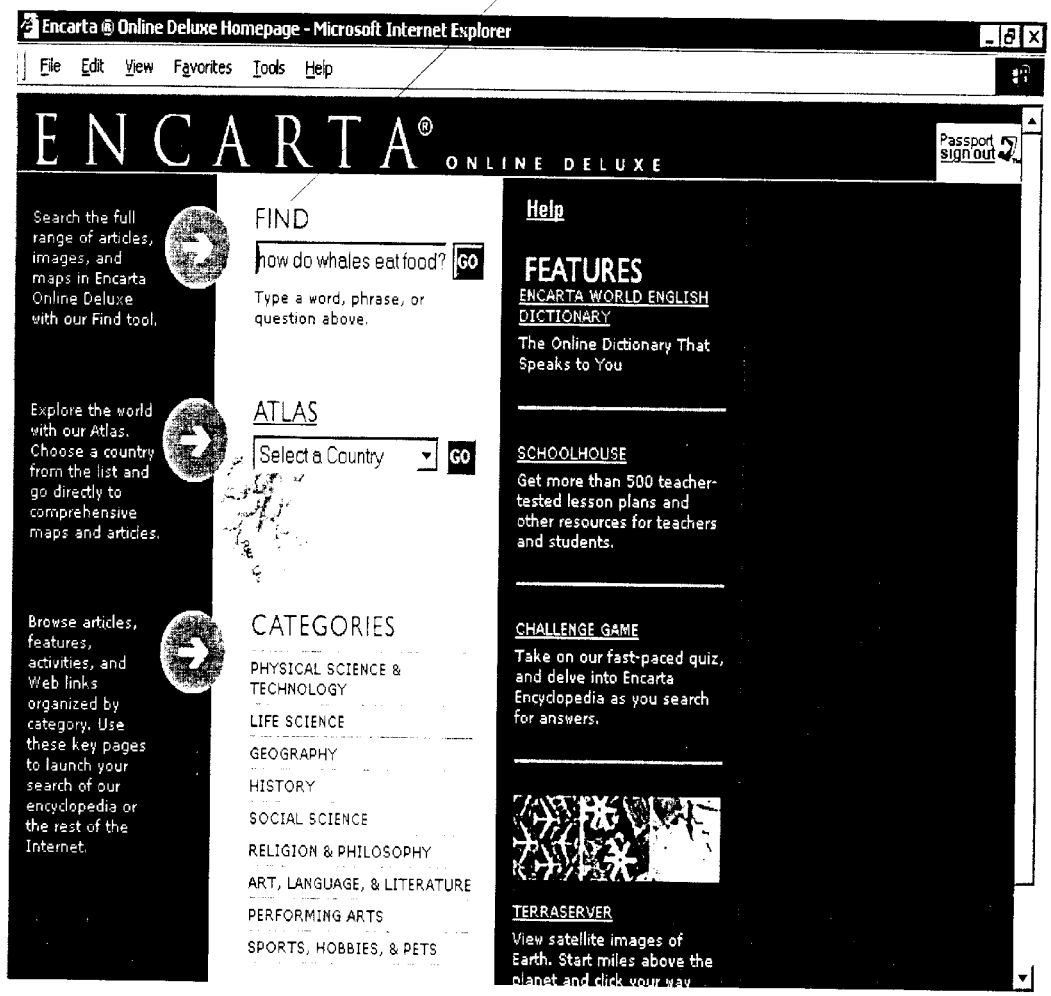
FIGS. 17–20 are screen shots illustrating exemplary screen displays for the query "How do whales eat food?".

FIGS. 17–20 are screen shots illustrating exemplary displays for the query "How do whales eat food?". FIG. 17 is a screen shot 1700 illustrating an exemplary display for the query "How do whales eat food?". The Find 1710 allows the user to enter the query "How do whales eat food?" and press the "GO" button.

Figure 18:
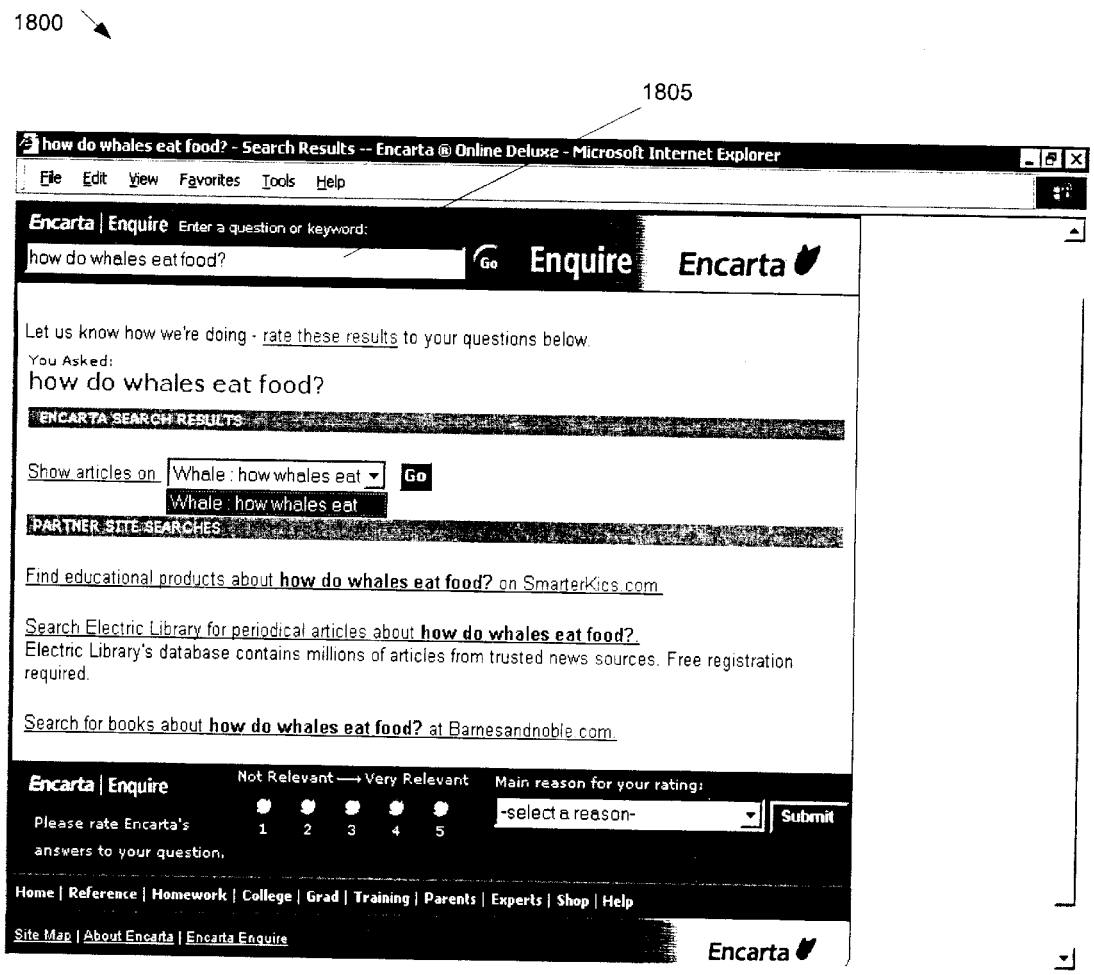

FIG. 18 is a screen shot 1800 illustrating exemplary matches for the query "How do whales eat food?". The query "How do whales eat food?" is displayed in the Query 1805. The Rate These Results 1810 allows the user to jump to the bottom of the page to the Rating Questions 1840, where the user can indicate how relevant the matches were, and the reason for the rating. The You Asked 1815 also displays the query "How do whales eat food?". Because of the nature of this query, there is no Best Match. Search Results 1825 provides the link to just one related article with the index: "Whale: how whales eat". There are no Search Results for this query. The Partner Site Searches 1835 provide links to educational products, periodical articles, and books.

Figure 19:
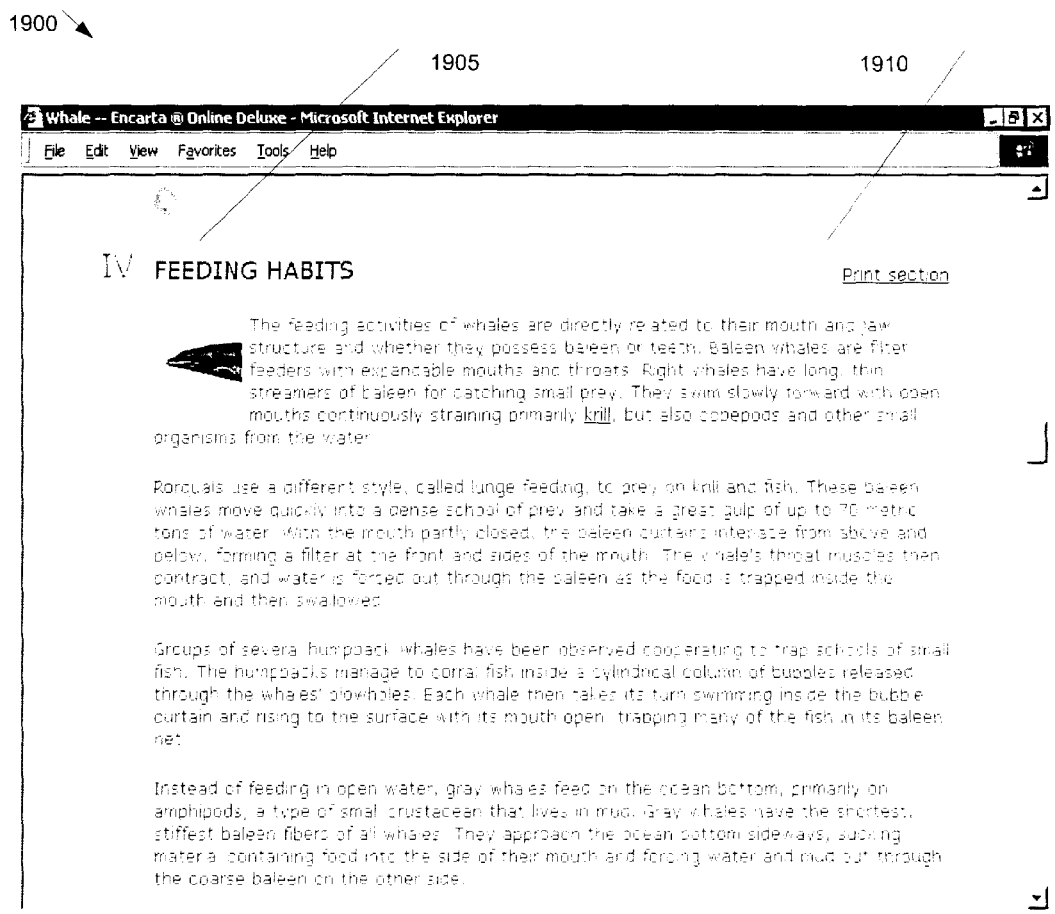

FIG. 19 is a screen shot 1900 illustrating an exemplary display for the Search Result 1825 for the query "How do whales eat food?". The only matched article has the link "Whale: how whales eat". By pressing on this link on the screen shot 1800, the user is taken to the screen shot 1900, which is a section entitled "Feeding Habits" 1905 in the article "Whale". The user has the Print Section 1910 option. The user can also use the Scroll Bar 1915 to scroll through the entire "Whale" article.

Figure 20:
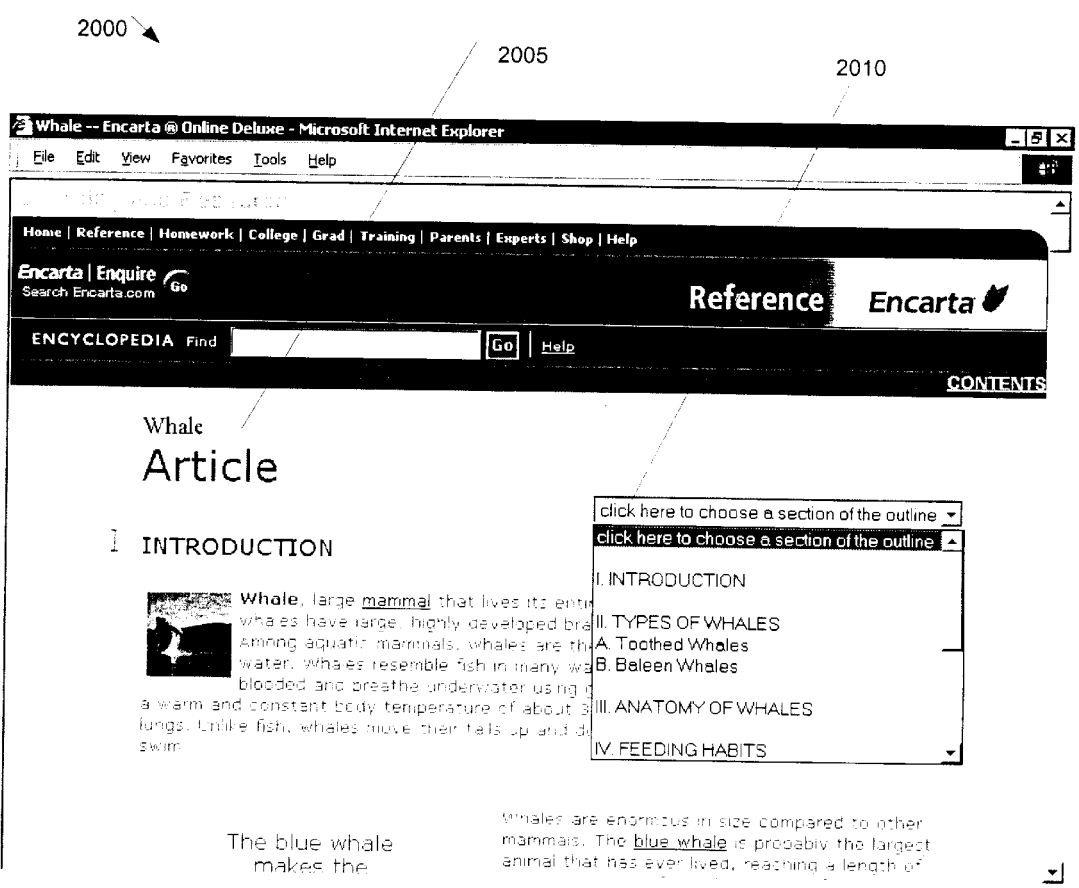

FIG. 20 is a screen shot 2000 illustrating an exemplary display for the Article "Whale" 2005, which is accessed by using the Scroll Bar 1915 of FIG. 19. After scrolling to the top of the article, the user has the option to display the Article Outline 2010. This option will help the user find the pertinent information being sought.

What is claimed is:

1. A computer system for searching and retrieving information from at least one information source, comprising:

a searchable content database comprising at least one index from the at least one information source, each index containing index information;

a user interface for receiving search terms in the searchable content database from a user of the computer system and for displaying search results; and a search component for searching for the search terms and retrieving the information that contains the search terms, the search component comprising a natural language processor for translating the search terms into prioritized clustered tokens.

2. The system of claim 1, further comprising a plurality of information sources.

3. The system of claim 2, wherein the searchable content database further comprises a plurality of indexes from the plurality of information sources.

4. The system of claim 1, wherein the search component further comprises:

an exact search mechanism for searching for an exact match for the search terms; and a full text search mechanism for searching for a match for the prioritized clustered tokens.

5. The system of claim 1, wherein the search component further comprises:

an exact search mechanism for searching for an exact match for the search terms.

6. The system of claim 1, wherein the search component further comprises:

a full text search mechanism for searching for a match for the prioritized clustered tokens.

7. The system of claim 1, wherein the searchable content database further comprises:

a full text index comprising the full text of the at least one index; and a lookup table comprising the index information from the at least one index.

8. A method for searching and retrieving information from at least one information source, comprising the steps of:

retrieving search terms on a user interface;

translating the search terms into prioritized clustered tokens;

searching the information source for each match to the prioritized clustered tokens to identify search results; and displaying the search results on the user interface.

9. The method of claim 8, further comprising a plurality of information sources.

10. The method of claim 8, further comprising the step of:

searching for an exact match for the search terms.

11. The method of claim 10, further comprising the steps of:

retrieving any search results from the search for the exact match for the search terms; and sorting the search results and moving the search results to a results database.

12. The method of claim 11, further comprising the step of emptying the results database for holding the search results.

13. The method of claim 8, further comprising the step of prioritizing the prioritized clustered tokens using a predetermined set of priority rules, wherein the predetermined set of priority rules prioritize labels associated with the search terms.

14. The method of claim 11, wherein the step of sorting the search results further comprises the steps of:

categorizing the search results into categories by word count;

sorting the categories by a predetermined priority; and sorting the search results within the prioritized categories by offset.

15. The method of claim 14, further comprising the step of determining the offset by valuing the search results obtained by matching original query search terms higher than the search results obtained by word clusters for each original query search term.

16. The method of claim 14, further comprising the step of determining the offset by valuing search results with the prioritized clustered tokens near the beginning of the search result more than search results with the prioritized clustered tokens near the end of the search result.

17. A computer-readable medium having computer-executable instructions for performing steps comprising:

retrieving search terms from a user interface;

translating the search terms into clustered tokens;

assigning a priority to each of the clustered tokens by using a predetermined set of priority rules to generate prioritized clustered tokens, wherein the predetermined set of priority rules prioritize labels associated with the search terms;

searching for a match for the prioritized clustered tokens; and displaying search results on the user interface.

18. The computer-readable medium of claim 17, further comprising the step of searching for an exact match for the search terms.

19. The computer-readable medium of claim 18, further comprising the steps of:

retrieving any search results from the search for the exact match for the search terms; and sorting the search results and moving the search results to a results database.

20. The computer-readable medium of claim 19, further comprising the step of emptying the results database for holding the search results.

21. The computer-readable medium of claim 19, wherein the step of sorting the search results further comprises the steps of:

categorizing the search results into categories by word count;

sorting the categories by a predetermined priority; and sorting the search results within the prioritized categories by offset.

22. The computer-readable medium of claim 21, further comprising the step of determining the offset by valuing the search results obtained by matching original query search terms higher than the search results obtained by word clusters for each original query search term.

23. The computer-readable medium of claim 21, further comprising the step of determining the offset by valuing search results with the prioritized clustered tokens near the beginning of the search result more than search results with the prioritized clustered tokens near the end of the search result.

* * * * *